United States Patent Office 3,734,958
Patented May 22, 1973

3,734,958
PROCESS FOR THE PREPARATION OF DIORGANOCHLOROPHINES
Andre Rio, Lyon, Rhone, France, assignor to Rhone-Poulenc S.A., Paris, France
No Drawing. Filed Sept. 5, 1969, Ser. No. 855,724
Claims priority, application France, Sept. 9, 1968, 165,535
Int. Cl. C07f 9/52
U.S. Cl. 260—543 P        6 Claims

ABSTRACT OF THE DISCLOSURE

Diorganochlorophosphines of the formula:

$$R_2\text{—P—Cl}$$

wherein R is a hydrocarbon radical are prepared by heating white phosphorus with a compound of the formula R—Cl in the presence of a compound of the formula $$R'\text{—P—Cl}_2$$

where R' is a hydrocarbon radical and may be the same as or different from R.

---

The present invention relates to a process for preparing diorganochlorophosphine by the reaction of white phosphorus with a chlorine-containing organic compound.

Various processes for the preparation of halophosphines by the reaction of an organic halide with elemental phosphorus at a high temperature have already been proposed. U.S. patents specification No. 3,057,917 describes a process for preparing halophosphines such as alkylhalophosphines or arylhalophosphines which comprises reacting an organic halide, in the vapour form, with red phosphorus in the presence or absence of a metal catalyst such as silver or copper. By this process the organodihalophosphine is formed predominantly, with small amounts of the diorganohalophosphine.

Russian patent specification No. 130,512 proposes a process for preparing halophosphines which comprises reacting alkyl or aryl halides with white phosphorus. Although organodihalophosphines are still formed predominantly, considerable amounts of the diorganohalophosphines are also formed, specially in the case of the brominated derivatives.

On the other hand it has been found (cf. L. Maier Helv. Chim. Acts. 46, p. 3032 [1963]) that chlorobenzene does not react with white phosphorus when heated to 320° C. and that an explosion results on heating to 400° C.

N. K. Bliznyuk et al., J. Gen. Chem. U.S.S.R. 37, pp. 840–841 (1967) have synthesized halophosphines directly by reacting alkyl or aryl halides with white phosphorus in phosphorus trichloride in the presence of a catalyst such as iodine, bromine and alkyl or aryl iodide or bromide or a phosphinic halide. Thus depending on the alkyl or aryl chlorides used, the corresponding dichlorophosphine is prepared.

The process of the present invention for preparing diorganochlorophosphines of the formula:

$$R_2\text{—P—Cl} \quad (I)$$

in which R is a hydrocarbon radical, comprises heating white phosphorus with a compound of the formula:

$$R\text{—Cl} \quad (II)$$

wherein R is as hereinbefore defined, in the liquid phase, and in the presence of an organodichlorophosphine of general formula:

$$R'\text{—P—Cl}_2 \quad (III)$$

wherein R' is a hydrocarbon radical which may be identical to or different from R.

More specifically, R and R' may be the same or different and each represents a linear or branched alkyl radical containing 1 to 20 carbon atoms, such as methyl, ethyl, propyl, butyl, isobutyl, t-butyl, pentyl or octyl; an aryl radical, such as the phenyl, o-tolyl, m-tolyl, or p-tolyl; or an aralkyl radical such as benzyl.

The process is of particular value for preparing diarylchlorophosphines from aryl chlorides of Formula II in which R represents a phenyl or tolyl radical.

Although the process can be carried out in the presence of any dichlorophosphine of Formula III, it is preferable to use the dichlorophosphine which contains the same organic residue as the diorganochlorophosphine to be prepared, as this decreases the problems involved in separation of the various components from the reaction medium. Thus, to prepare diphenylchlorophosphine, the reaction is preferably carried out in the presence of phenyldichlorophosphine.

The amount of organodichlorophosphine of Formula III present in the reaction can vary from 0.01 mol to 2 mols per mol of organic chloride employed. Larger amounts could be used but are not justified.

In general, 1.5 to 2.5 gram atoms, preferably about 2 gram atoms of phosphorus, are used per 3 mols of organic chloride.

The reaction temperature depends on the reagents employed but it is generally between 200 and 400° C.

The reaction can be carried out under atmospheric pressure or under superatmospheric pressure. If the reaction temperature is higher than the boiling point of the organic halide, the process is conveniently carried out under the autogenous pressure of the reagents.

Diorganochlorophosphines are very useful intermediate compounds in organic synthesis. In particular, they may be used to prepare various phosphorus-containing insecticides and to prepare also phosphinic acid esters which may in turn be converted to phosphine oxides.

The following examples illustrate the invention.

EXAMPLE I 0.2 gram atom (6.2 g.) of white phosphorus, 0.32 mol of chlorobenzene (36 g.) and 17.9 g. of phenyldichlorophosphine (0.1 mol) are introduced into a tantalum autoclave. The temperature of the contents of the autoclave is raised to 340° C. over 4 hours and is then allowed to cool to 20° C. Distillation of the reaction mixture yields 8.6 g. of a mixture of PCl₃ and chlorobenzene; 22.2 g. of phenyldichlorophosphine (boiling point under 0.2 mm. of mercury: 45° C.) and 22 g. of diphenylchlorophosphine (boiling point 109° C. under 0.3 mm. of mercury).

Thus 48.9% of the phosphorus employed has been converted to diphenylmonochlorophosphine and 11% to phenyldichlorophosphine.

The diphenylchlorophosphine was characterised by conversion to diphenylphosphinic acid by hydrolysis followed by oxidation, and the latter was characterised by its melting point and its infra-red spectrum.

EXAMPLE 2

Example 1 was repeated but the reagents were heated to 360° C. for 1 hour. 23.7 g. of diphenylmonochlorophosphine were thus obtained. 4.3 g. of phenyldichlorophosphine were formed during the reaction and thus 52.7% of the phosphorus employed was converted to monochlorophosphine and 11% to dichlorophosphine.

EXAMPLE 3

Two experiments were carried out under the conditions of Example 1 except that 8.95 g. (0.05 mol) of phenyldichlorophosphine (Experiment A) and 26.85 g. (0.15 mol) of phenyldichlorophosphine (Experiment B) were used. The following results were obtained.

| | Phenyldichlorophosphine | | Diphenylchlorophosphine | |
|---|---|---|---|---|
| | Yield (g.) | Percent of the phosphorus employed | Yield (g.) | Percent of the phosphorus employed |
| Experiment: | | | | |
| A | 8.95 | 25 | 19.27 | 42.9 |
| B | 3.4 | 9.5 | 19.27 | 42.9 |

EXAMPLE 4

The procedure of Example 2 is followed, except that the chlorobenzene is replaced by 40 g. (0.32 mol) of p-chlorotoluene and the phenyldichlorophosphine by 19.3 g. (0.1 mol) of p-tolyldichlorophosphine.

8 g. of di(p-tolyl)chlorophosphine were thus obtained and 0.5 g. of p-tolyldichlorophosphine was formed. Thus 16.1% of the phosphorus employed was converted to di-(p-tolyl)chlorophosphine and 1.29% to p-tolyldichlorophosphine.

I claim:

1. A process for preparing an arylchlorophosphine comprising a major proportion of a diarylchlorophosphine of the formula:

(I)

wherein R is an aryl radical which process comprises heating white phosphorus with a compound of the formula:

R—Cl (II)

wherein R is as hereinbefore defined in the liquid phase and in the presence of a preformed aryl dichlorophosphine of the formula:

(III)

wherein R is an aryl radical.

2. A process according to claim 1 wherein R is a phenyl or tolyl radical.

3. A process according to claim 1 wherein 0.01 to 2 mols of organodichlorophosphine are used per mol of compound of the formula R—Cl.

4. A process according to claim 1 wherein 1.5 to 2.5 gram atoms of white phosphorus are used per each 3 mols of compound of the formula R—Cl.

5. A process according to claim 1 wherein the reaction temperature is 200° to 400° C.

6. A process according to claim 1 wherein the reaction is carried out under autogenous pressure.

References Cited

UNITED STATES PATENTS 3,057,917  10/1962  Maier _____ 260—543

FOREIGN PATENTS 130,512  2/1960  U.S.S.R.
130,513  2/1960  U.S.S.R.

LORRAINE A. WEINBERGER, Primary Examiner

R. GERSTL, Assistant Examiner